(12) United States Patent
Wang

(10) Patent No.: US 7,447,928 B2
(45) Date of Patent: Nov. 4, 2008

(54) METHOD FOR BOOTING COMPUTER MULTIMEDIA SYSTEMS WITH A HOT KEY STANDBY STATE

(75) Inventor: Huai-Cheng Wang, Taipei (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 364 days.

(21) Appl. No.: 11/242,849

(22) Filed: Oct. 5, 2005

(65) Prior Publication Data

US 2007/0028132 A1 Feb. 1, 2007

(30) Foreign Application Priority Data

Jul. 26, 2005 (TW) ............... 94125322 A

(51) Int. Cl.
*G06F 1/00* (2006.01)
*G06F 1/26* (2006.01)
*G06F 1/32* (2006.01)

(52) U.S. Cl. ............... 713/323; 713/300; 713/310; 713/320

(58) Field of Classification Search ............... 713/323
See application file for complete search history.

(56) References Cited

U.S. PATENT DOCUMENTS 6,928,542 B2 * 8/2005 Wen et al. ............... 713/2
7,076,646 B2 * 7/2006 Chang ............... 713/1

FOREIGN PATENT DOCUMENTS

EP 1460536 9/2004

OTHER PUBLICATIONS

Official Action from the German Patent Office mailed Oct. 25, 2007.
* cited by examiner

*Primary Examiner*—Rehana Perveen
*Assistant Examiner*—Michael J Brown
(74) *Attorney, Agent, or Firm*—Rosenberg, Klein & Lee

(57) ABSTRACT

A method for express activation of multimedia playing for a computer multimedia system with a hot key standby state is provided. The computer of the computer multimedia system, after completing BIOS booting and operating system booting, enters a hot key standby state. In the hot key standby state, when a preset hot key is operated, the computer awakes from the hot key standby state and enters a multimedia operational state. The computer loads and executes the multimedia device driver to activate the multimedia device. Then, the computer loads and executes the multimedia device application program to operate the multimedia device.

8 Claims, 4 Drawing Sheets

METHOD FOR BOOTING COMPUTER MULTIMEDIA SYSTEMS WITH A HOT KEY STANDBY STATE

FIELD OF THE INVENTION

The present invention relates to a method for booting computer multimedia devices and, more particularly, to a method for fast executing computer programs with a hot key standby state.

BACKGROUND OF THE INVENTION

As the computer technology continuously progresses, the computer-based multimedia system, constructed with a computer and multimedia devices, is widely used in various occasions, such as offices, households, and business locations. However, the design of the conventional computer-based multimedia systems is basically linking an audiovisual player device to a computer system through a computer interface. With this type of design, the user usually needs to boot the computer system in order to activate and operate the audiovisual player. In other words, the user must wait until the computer system completes the BIOS program initialization, POST program, peripheral detection and driving, operating system activation, system configuration, and so on, before the user can execute the audiovisual program to play the audiovisual data.

In addition, when the computer completes the booting process, all the connected peripherals are activated and in a ready-to-play state, which consumes a considerable amount of power. To save the power consumption and prolong the life span of the computer system, most operating systems of personal computers (PCs), such as Windows XP, Windows 2000, and Windows Me, integrated the power management function of the advanced configuration and power interface (ACPI). Therefore, the power management operation can be performed through the ACPI interface.

The ACPI interface can manage the power consumption of the peripherals. The ACPI interface specifies various power management states, including active, hibernation, standby, and shutdown. Based on the user's setting, the computer system can enter the standby or hibernation state. The standby state is a low-power state, and the hibernation state reduces further power consumption.

In a typical ACPI structure, the power states are defined as:

S0: normal power supply state;

S1: first stage standby state, in which the power to central processing unit, memory, and fan stays on while the power to display and hard disk is off;

S2: second stage standby state, in which the power to central processing unit, cache, monitor, and hard disk is off;

S3: third stage standby state, in which only minimum power stays supplied to RAM;

S4: hibernation state, in which power to all the devices and elements is off, with the operating system storing all the data and execution states before terminating the power supply to the devices and elements; and S5: shutdown state, in which all the power supply is turned off.

Based on the user's setting, the computer system can enter the standby or hibernation state. The standby state is a low-power state, and the hibernation state reduces further power consumption.

SUMMARY OF THE INVENTION

To overcome the aforementioned problem, the conventional way is to divide a hard disk into different segments and install a first operating system, such as a Linux-based OS, and a second operating system, such as Window-based OS, and then modify the BIOS. Therefore, the user can select either a PC mode, which is the normal computer booting process or an AV mode, which is fast activation of multimedia playing. When the user selects the AV mode, the computer system does not execute the usual booting process when the computer is turned on. Instead, the computer system loads and executes a first operating system in the first memory region, and drives the audiovisual player, such as DVD playing. That is, the user does not enter the PC mode using the Windows OS; therefore, the time waiting for the system to finish the initialization of the hardware is saved.

However, although this technique achieves the fast activation of multimedia player, the hard disk partition and BIOS modification complicate the hard disk and the modified BIOS is not applicable to the general computers.

Also, the specific segment in the hard disk is used for storing programs and data required for activating the multimedia player, which leads to the inefficiency of the hard disk usage. The specific memory region does not allow user access and modification, which also restricts the usage of the hard disk.

In addition, even though the speed problem is overcome, power consumption remains a problem for the aforementioned technique. It is imperative to provide a solution to overcome both the speed and the power-consumption problems at the same time.

The primary object of the present invention is to provide a method for fast activation of multimedia player. The method integrates the fast activation function and the power-saving function.

Another object of the present invention is to provide a method for express activation of multimedia player with hot keys standby. After the computer completes the basic booting, the computer enters the hot key standby state. When any hot key is pressed when the computer is in the hot key standby state, the fast activation multimedia playing is performed.

To achieve the aforementioned objects, the present invention comprises a hot key standby state in the computer power management mechanism. The standby state is defined as a state in which the states of the hot keys can be detected and the power to monitor, hard disk, and fan can be turned off with only the minimum power being supplied to RAM. When the computer completes the BIOS and the operating system, the computer can be set to enter a hot key standby state. In the hot key standby state, when a hot key is detected to be operated by the user, the computer awakes from the hot key standby state and enters the AV mode to load and execute the driver of the multimedia player to activate the multimedia player, and then loads and executes the application program for the multimedia player.

In addition to the system-defined standby state, the computer also has a specific standby state, in which only hot keys associated with multimedia players can be operated and detected. When the user operates the hot keys for multimedia players, the computer activates the multimedia player for playing. In comparison with the current techniques, the present invention provides a method that can both achieve express activation of a multimedia player and power saving.

These and other objects, features, and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
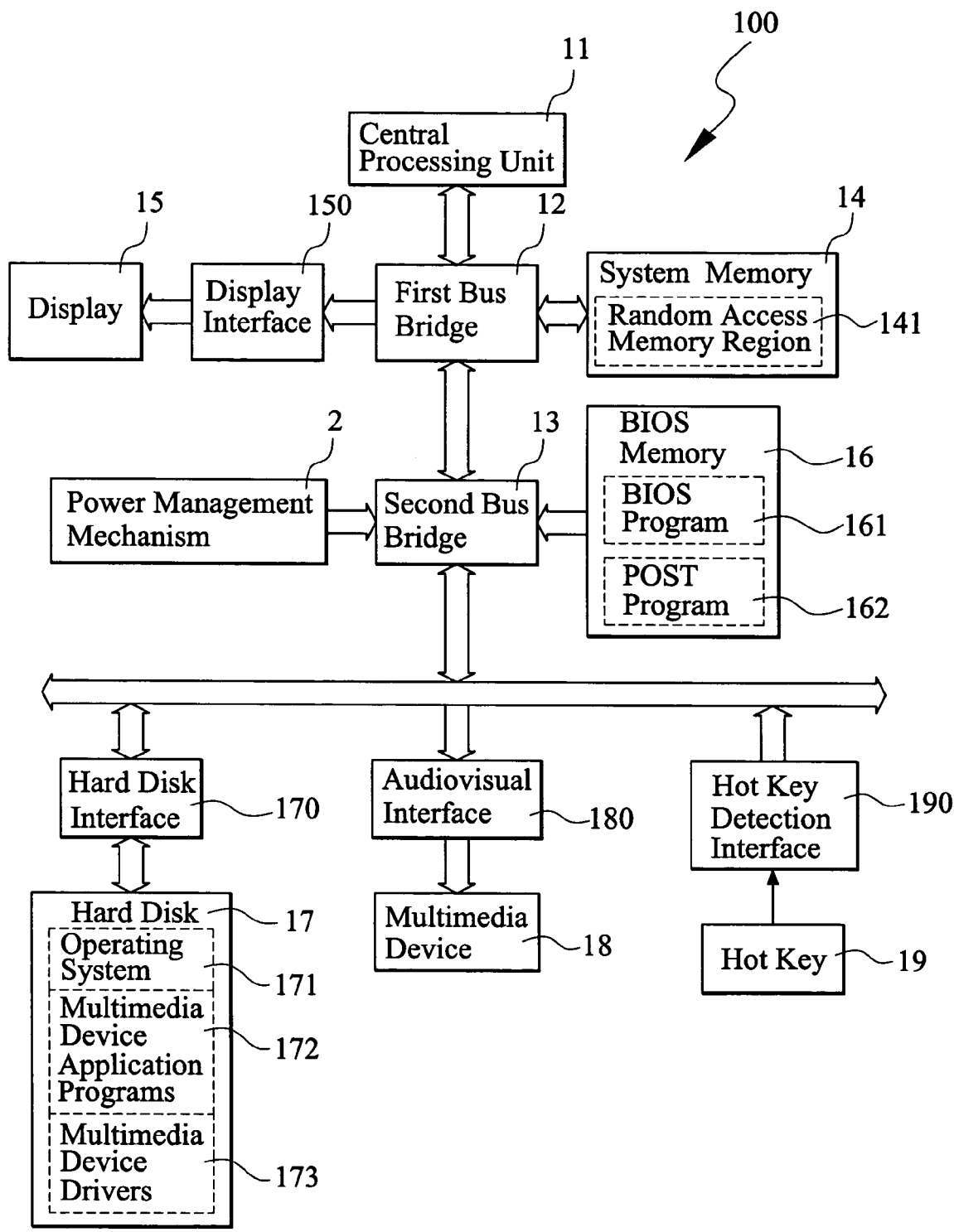
FIG. 1 shows a system functional block diagram of the first embodiment of the present invention.

With reference to the drawings and in particular to FIG. 1, which shows a system functional block diagram of a first embodiment of the present invention. A computer 100 comprises a central processing unit 11, a first bus bridge 12, and a second bus bridge 13. The central processing unit 11 is connected to the first bus bridge 12 through a system bus. The first bus bridge 12 is connected to a system memory 14 and is connected to a display 15 through a display interface 150.

The second bus bridge 13 is connected to a BIOS memory 16. The BIOS memory 16 stores a BIOS program 161 and a power on self test (POST) program 162, both required for booting the computer.

The second bus bridge 13 is connected to a hard disk interface 170 through a bus. The hard disk interface 170 is connected to a hard disk 17. The hard disk 17 is the data storage of the present invention. The hard disk 17 is installed with an operating system 171, multimedia device application programs 172, and multimedia device drivers 173.

The second bus bridge 13 is connected to a multimedia device 18 through an audiovisual interface 180. The multimedia device 18 can be a DVD player, MP3 player, CD player, a TV, and so on. The second bus bridge 13 can also be connected to other peripheral through appropriate peripheral interfaces.

The second bus bridge 13 of the computer 100 is connected to at least a hot key 19 through a hot key detection interface 190. The hot keys 19 can be defined as a control key for express activation of the multimedia player 18. The hot key 19 can be buttons installed on the panel of the corresponding multimedia player or on the computer. The hot key 19 can also be a specific key on the keyboard of the computer. The specific key can be decoded by keyboard controller, and identified by the central processing unit.

The second bus bridge 13 is connected to a power management mechanism 2 through a bus interface. The power management mechanism 2 can be an advanced configuration and power interface (ACPI) or advanced power management (APM) mechanism. The power management mechanism 2 can be managed by the operating system or the BIOS.

In addition to the power management functions provided by the power management mechanism 2, the present invention defines a hot key standby state to meet the requirements of the present invention. Therefore, the present invention not only saves the power consumption, but also detects the hot key state and activates multimedia player rapidly.

The hot key standby state defined by the present invention can stop the power supply to the devices and components of the computer 100 unrelated to the multimedia playing functions. With only the hot key detection interface 190 and the hot key 19 being in the operational state, the hot key standby state only provides the minimum power to RAM.

Figure 2:
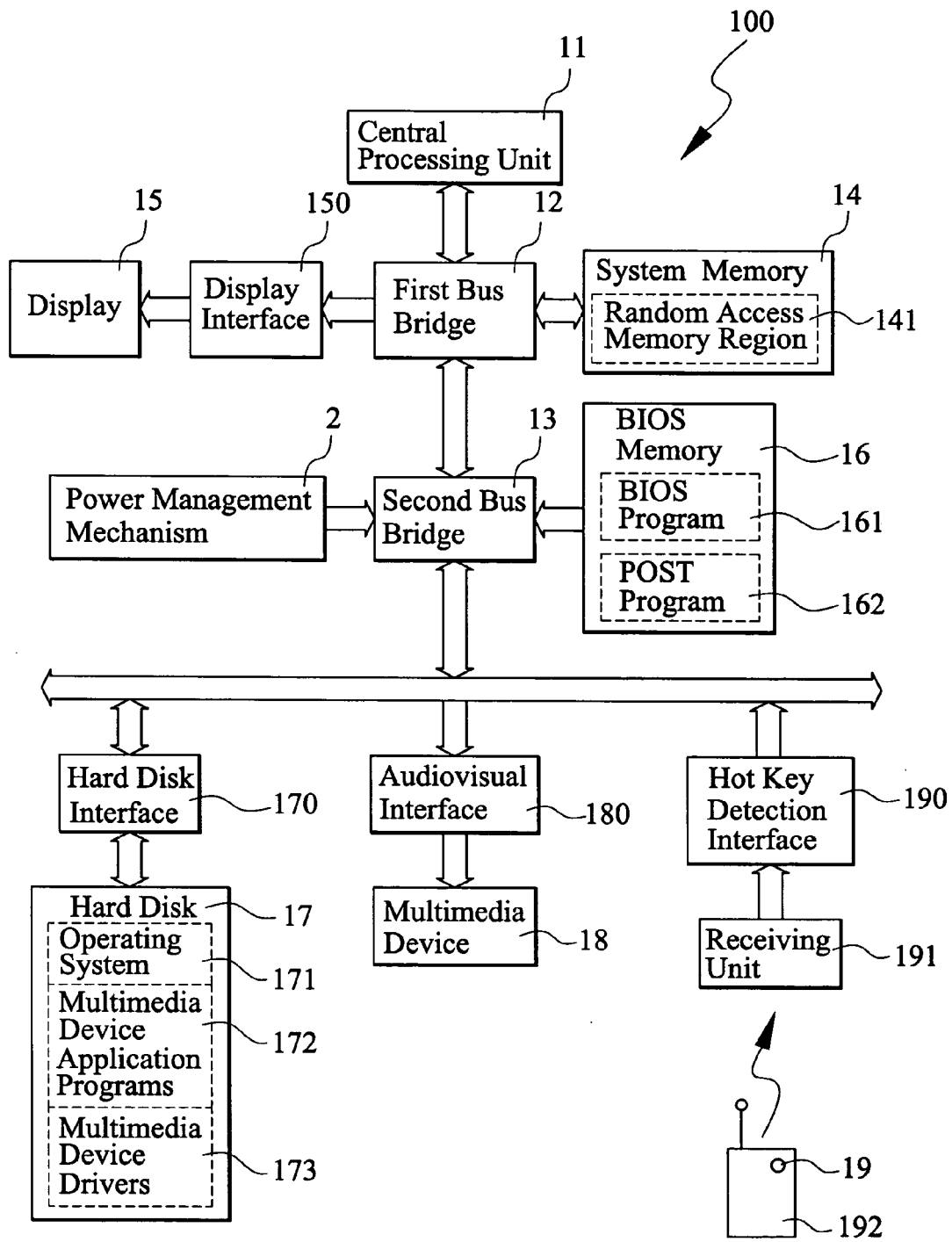
FIG. 2 shows a system functional block diagram of the second embodiment of the present invention.

FIG. 2 shows the system functional block diagram of the second embodiment of the present invention. Most of the elements of this embodiment are the same as those in the first embodiment. The difference is that the hot key detection interface 190 is connected to a receiving unit 191. The receiving unit 191 receives a wireless signal sent by a transmitting unit 192. The hot key 19 is installed on the transmitting unit 192. When the user operates the hot key 19, the transmitting unit 192 sends a wireless signal, which is received by the receiving unit 191. The hot key detection interface 190 passes the received signal through the second bus bridge 13, the first bus bridge 12 to the central processing unit 11.

Figure 3:
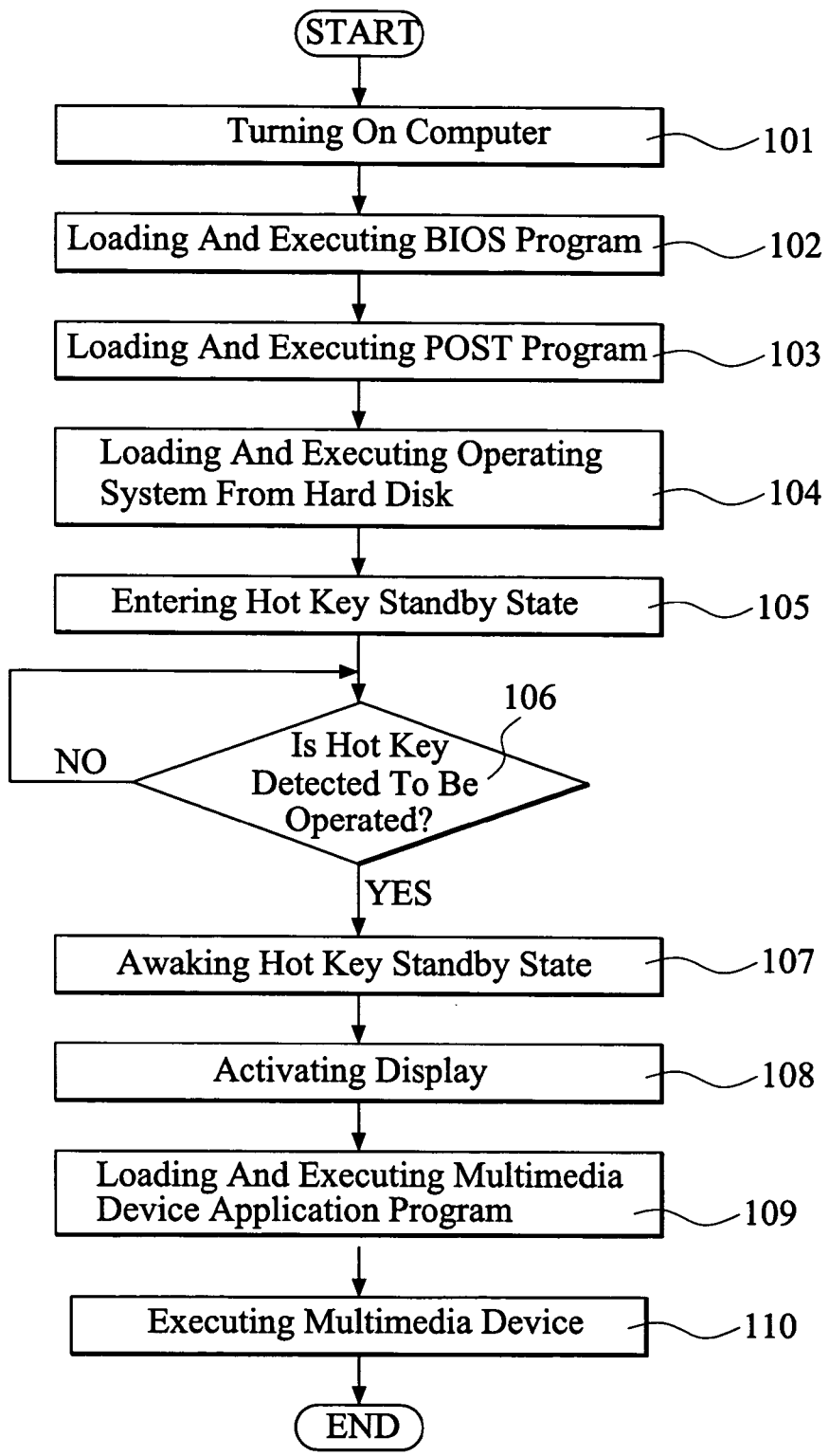
FIG. 3 shows a control flowchart of the embodiment of FIG. 1.

FIG. 3 shows the control flowchart of the embodiment of FIG. 1. The following description refers to both FIGS. 1 and 3.

When the computer 100 is turned on (step 101), the computer 100 enters the basic system booting steps. That is, the computer 100 loads and executes the BIOS program 161 (step 102) and the POST program 162 (step 103) from the BIOS memory 16. Then, the BIOS program 161 detects the devices, such as display 15, hard disk 17, multimedia device 18, and hot key 19, connected to the computer 100.

After the computer 100 completes the initialization and POST programs, the BIOS program 161 loads and executes the operating system 171 from the hard disk 17 (step 104). At this point, the computer 100 completes the booting process.

After a pre-set duration after the completion of booting process or at the user's setting, the computer 100 enters the hot key standby state under the control of the power management mechanism 2 (step 105). In this state, the computer 100 stops power supply to most of the devices and elements of the computer 100, with only the hot key detection interface 190 and the hot key 19 remaining in operational state.

When the computer 100 enters the hot key standby state, if the hot key 19 is detected to be operated (step 106), the state of the hot key 19 is transmitted through the hot key detection interface 190, the second bus bridge 13, and the first bus bridge 12 to the central processing unit 11.

When the central processing unit 11 detects the hot key 19 being operated, the computer 100 awakes from the hot key standby state and enters multimedia operation state under the control of the power management mechanism 2 (step 107). In this state, the display 15, the hard disk 17, and the multimedia device 18 are activated (step 108), and multimedia device application program 172 is loaded from the hard disk 17 and executed (step 109). This achieves the express activation and execution of the multimedia player (step 110).

Figure 4:
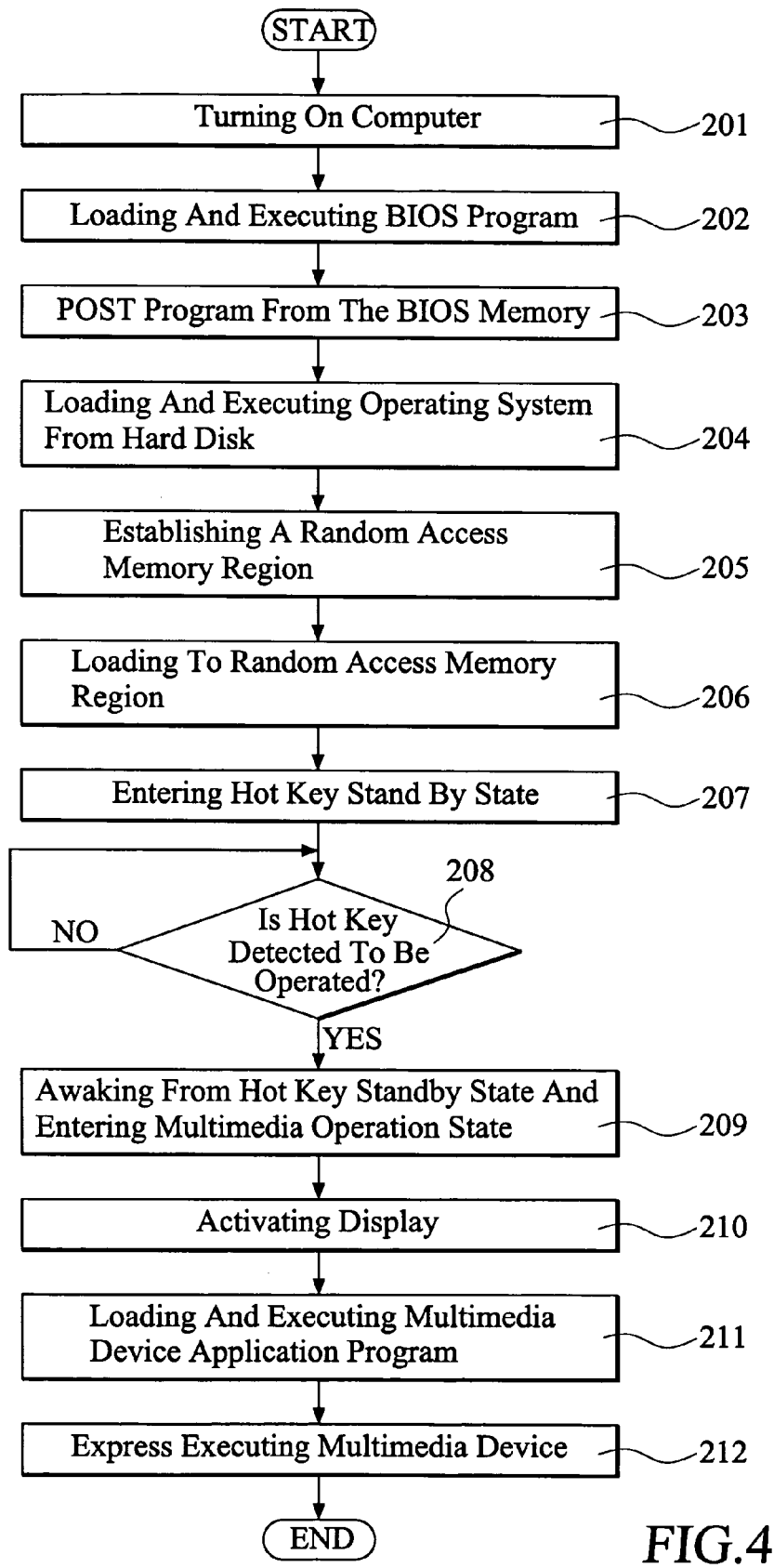
FIG. 4 shows a control flowchart of the embodiment of FIG. 2.

FIG. 4 shows the control flowchart of the second embodiment of FIG. 2. When the computer 100 is turned on (step 201), the computer 100 enters the basic system booting steps. That is, the computer 100 loads and executes the BIOS program 161 (step 202) and the POST program 162 (step 203) from the BIOS memory 16. Then, the BIOS program 161 detects the devices, such as display 15, hard disk 17, multimedia device 18, and hot key 19, connected to the computer 100.

After the computer 100 completes the initialization and POST programs, the BIOS program 161 loads and executes operating system 171 from the hard disk 17 (step 204). At this point, the computer 100 completes the booting process.

After completing the booting process, the computer 100 establishes a random access memory region 141 in the system memory 14 (step 205), and then loads the multimedia device application program 172 to the random access memory region 141 (step 206).

After a pre-set duration after the completion of the booting process or at the user's setting, the computer 100 enters the hot key standby state under the control of the power management mechanism 2 (step 207). In this state, the computer 100 stops power supply to most of the devices and elements of the computer 100, with only the hot key detection interface 190 and the hot key 19 remaining in operational state.

When the computer 100 enters the hot key standby state, if the hot key 19 is detected to be operated (step 208), the state of the hot key 19 is transmitted through the hot key detection interface 190, the second bus bridge 13, and the first bus bridge 12 to the central processing unit 11.

When the central processing unit 11 detects the hot key 19 being operated, the computer 100 awakes from the hot key standby state and enters the multimedia operation state under the control of the power management mechanism 2 (step 209). In this state, the display 15, the hard disk 17, and the multimedia device 18 are activated (step 210), and the multimedia device application program 172 is loaded from the hard disk 17 and executed (step 211). This achieves the express activation and execution of the multimedia player (step 212).

While the invention has been described in connection with what is presently considered to the most practical and preferred embodiments, it is to be understood that the invention is not to be limited to the disclosed embodiment, but on the contrary, is intended to cover various modifications and equivalent arrangement included within the spirit and scope of the appended claims.

What is claimed is:

1. A method for express activation of a multimedia player with a hot key standby state, applicable to a computer system having a data storage, a system memory, a BIOS, at least a hot key, and at least a multimedia device, the data storage storing an operating system, a multimedia device application, and a multimedia device driver, the method comprising the steps of:

(a) the computer completing BIOS booting;
    (b) loading and executing the operating system of the computer;
    (c) the computer entering the hot key standby state, the state of the hot key being detectable in the hot key standby state wherein when entering the hot key standby state only a hot key interface and said hot key are in an operational mode;
    (d) detecting whether the hot key being operated;
    (e) upon detecting the hot key being operated, the computer awakening from the hot key standby state and entering a multimedia operational state, defined as executing multimedia device application program associated with the hot key being operated; and
    (f) loading and executing the multimedia device application program associated to the hot key.

2. The method as claimed in claim 1, wherein the hot key is a button installed on the computer.

3. The method as claimed in claim 1, wherein the hot key is a preset specific key on a keyboard of the computer.

4. The method as claimed in claim 1, wherein the hot key is installed on a remote unit, the remote unit transmits a signal representing the operation of the hot key to a receiving unit connected to the computer.

5. A method for express activation of multimedia player with a hot key standby state, applicable to a computer system having a data storage, a system memory, a BIOS, at least a hot key, and at least a multimedia device, the data storage storing an operating system, a multimedia device application, and a multimedia device driver, the method comprising the steps of:

(a) the computer completing BIOS booting;
    (b) loading and executing the operating system of the computer;
    (c) establishing a random access memory region in the system memory;
    (d) loading the multimedia device application program to the random access memory region;
    (e) the computer entering the hot key standby state, the state of the hot key being detectable in the hot key standby state wherein when entering the hot key standby state only a hot key interface and said hot key are in an operational mode;
    (f) detecting whether the hot key being operated;
    (g) upon detecting the hot key being operated, the computer awakening from the hot key standby state and entering a multimedia operational state, defined as executing multimedia device application program associated with the hot key being operated; and
    (h) loading and executing the multimedia device application program associated to the hot key from the random access memory region.

6. The method as claimed in claim 5, wherein the hot key is a button installed on the computer.

7. The method as claimed in claim 5, wherein the hot key is a preset specific key on a keyboard of the computer.

8. The method as claimed in claim 5, wherein the hot key is installed on a remote unit, the remote unit transmits a signal representing the operation of the hot key to a receiving unit connected to the computer.

* * * * *